(No Model.)
C. A. CASE.
MANUFACTURE OF ASPHALT PAVEMENTS.
No. 393,616. Patented Nov. 27, 1888.
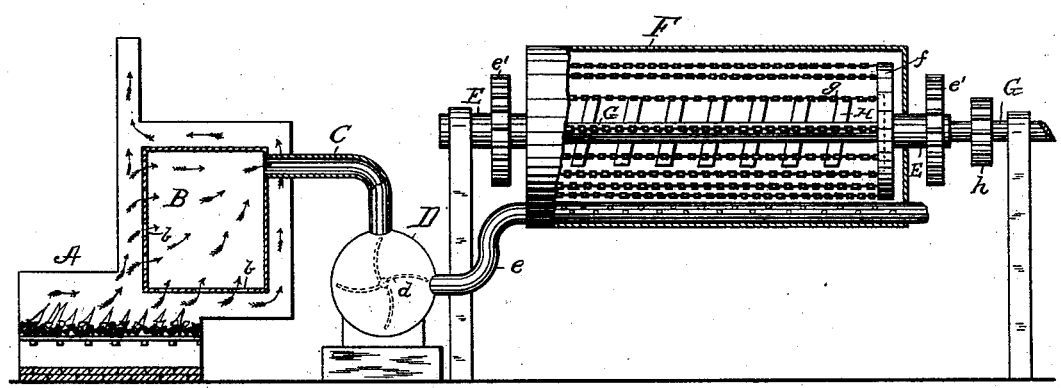
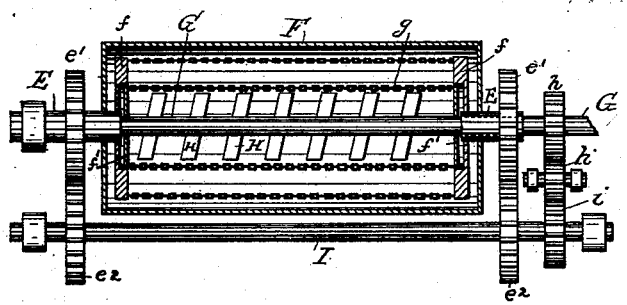   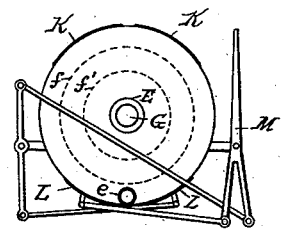
WITNESSES:
E. J. Griswold
W. C. Baird
INVENTOR,
Charles A. Case,
BY Frederick M. Crocker,
ATTORNEY.

UNITED STATES PATENT OFFICE.

CHARLES A. CASE, OF CHATTANOOGA, TENNESSEE.

MANUFACTURE OF ASPHALT PAVEMENTS.

SPECIFICATION forming part of Letters Patent No. 393,616, dated November 27, 1888.

Application filed December 13, 1887. Serial No. 257,774. (No model.)

*To all whom it may concern:*

Be it known that I, CHARLES A. CASE, of Chattanooga, Tennessee, have invented a new and useful Improvement in Machines for Use in the Manufacture of Asphalt for Pavements, of which the following is a specification.

My invention relates to machines employed in the preparation or compounding of asphalt used for the paving of streets or analogous purposes; and its object is to so construct a machine that the mixer thereof may be charged with a dry heat, which will melt the tar more readily than heretofore and expedite the mixing thereof, and particularly to enable the remelting and remixing of pavement which has been taken up and heretofore useless, owing to the lack of proper means for disintegrating or remixing the same.

My invention consists of a furnace provided with a reservoir from which hot air is forced by means of a fan into a mixer provided with two circular disks arranged upon the inner side of each end thereof, the inside two of which are attached to an axle which passes through the center of the mixer, while the other two are attached, respectively, to two loose axle-boxes, which are connected at their inner ends to the outer surfaces of the disks. The two inside, and also the outside, disks are attached to each other by chains at their peripheries. The axle is extended through and outside of each end of the mixer and provided with cog-wheels, which in cogging with other wheels cause the inside chained disks to revolve in one direction and the outside chained disks to revolve in the opposite direction. At the bottom of the mixer, by means of a perforated pipe, hot air is forced in by a fan, which draws the air from a reservoir, which in turn receives its supply from a furnace. The mixer is provided upon its upper side with sliding doors, through which it is filled from a platform, and upon its under side with doors, worked by a number of levers, through which the contents are removed. Steam or any suitable power may be used as a motor.

In the accompanying drawings, illustrating my invention, Figure 1 is a side view of my improved machine, showing the mixer partly cut away. Fig. 2 is a sectional view of the same, showing the disks connected by chains; and Fig. 3 an end view showing the lever for opening and closing the lower doors or slides.

A indicates a furnace, which is provided with a hot-air reservoir, B, which admits the hot air of the furnace through openings $b$. From the upper corner of the reservoir passes a pipe, C, into the air-tight casing D of the fan $d$. From the side of the casing D a pipe, $e$, passes into the mixer F, that portion of the pipe within the mixer being provided with perforations.

The mixer is preferably made of metal, and provided with two pairs of revolving disks, $ff'$, journaled at the respective inside ends of the mixer. The two smaller disks $f'$ are journaled upon the axle G, which passes through the mixer from end to end, as shown in Fig. 2, the peripheries of which are attached at suitable intervals by chains $g$. The disks $f$ are attached to revolving axle-boxes E E, which pass through the outer casing of the mixer, and are provided upon their outer ends with suitable cogs, $e'$, the inside centers of the disks being recessed to allow the disks $f'$ to revolve therein, thereby preventing the material from crowding between the disks. The peripheries of the disks $f$ are joined by chains in the same manner as the peripheries of the disks $f'$, above described.

The axle G is provided with paddles H, arranged as shown in Fig. 2, and is constructed to revolve within the loose boxes E, causing the chain-connected disks $f'$ and the paddles H to revolve independently of the disks $f$, the disks $f$ being attached to the revolving loose boxes E, which are in turn caused to revolve by suitable gearing independently of the axle G, carrying the disks $f'$.

The axle G is extended beyond the outer ends of the mixer F, and at one end is provided with a cog-wheel, $h$, which gears into an idle-wheel, $h'$, which in turn gears into a cog-wheel, $i$, upon the shaft I, supported in suitable bearings upon the outside of the mixer. Cog-wheels $e'$ of revolving boxes E gear into cog-wheels $e^2$ upon the revolving shaft I. This arrangement causes the chain-connected disks $f'$ and the paddles H upon the axle G to revolve in one direction, while the loose revolving axle-boxes E and the chain-connected disks, $f$, attached thereto are caused to revolve in the opposite direction.

Referring to Fig. 3, K indicates the doors on the top of the mixer F, which are opened for the purpose of introducing the material to be mixed. After being suitably mixed and disintegrated by the revolving disks and paddles and the hot air injected through the pipe $e$, the material is removed through doors or slides L at the bottom of the mixer, which are operated by a suitable bifurcated lever, M. The lever M, with its auxiliary mechanism, being old and well known, forms no part of this invention.

The fan is shown as located between the furnace and the mixer; but to this arrangement I do not confine myself, as the fan may be so placed as to inject cold air into the furnace, thereby forcing the hot air from the reservoir through the pipes into the mixer, which I consider an equivalent of my construction.

I claim as my invention—

1. A machine for the manufacture of asphalt, comprising a furnace, hot-air reservoir, fan, and mixer, substantially as and for the purpose described.

2. A machine for the manufacture of asphalt, comprising the furnace, the perforated hot-air reservoir, the fan, and the mixer provided with circular chain-connected disks, substantially as shown and described.

3. A machine for the manufacture of asphalt, comprising the furnace, the perforated hot-air reservoir, the fan, the mixer, and the pipe extending from the fan-casing into the mixer, that portion inclosed within the mixer being perforated, substantially as shown and described.

4. The combination of the shaft G, paddles H, and chain-connected disks $f$ and $f'$, the disks $f'$ lying in recesses in the disks $f$, substantially as described.

5. The mixer F, having a shaft, G, to which are attached chain-connected disks $f'$, and loosely-journaled axle-boxes extending beyond the outer ends of the mixer, to the inner edges of which are attached chain connected disks $f$, substantially as described.

6. The mixer F, having a shaft, G, provided with paddles H, loosely-journaled axles boxes E, cogs $h\ h'\ i$, and shaft I, provided with cogs $e^2$, arranged to gear with cogs $e'$ upon the axle-boxes E, substantially as shown and described.

CHARLES A. CASE.

Witnesses:
W. C. BAIRD,
C. E. AINSWORTH.